Nov. 10, 1964     S. L. SANTILLO     3,156,460
SEAT SPRING STRUCTURE
Filed July 25, 1962
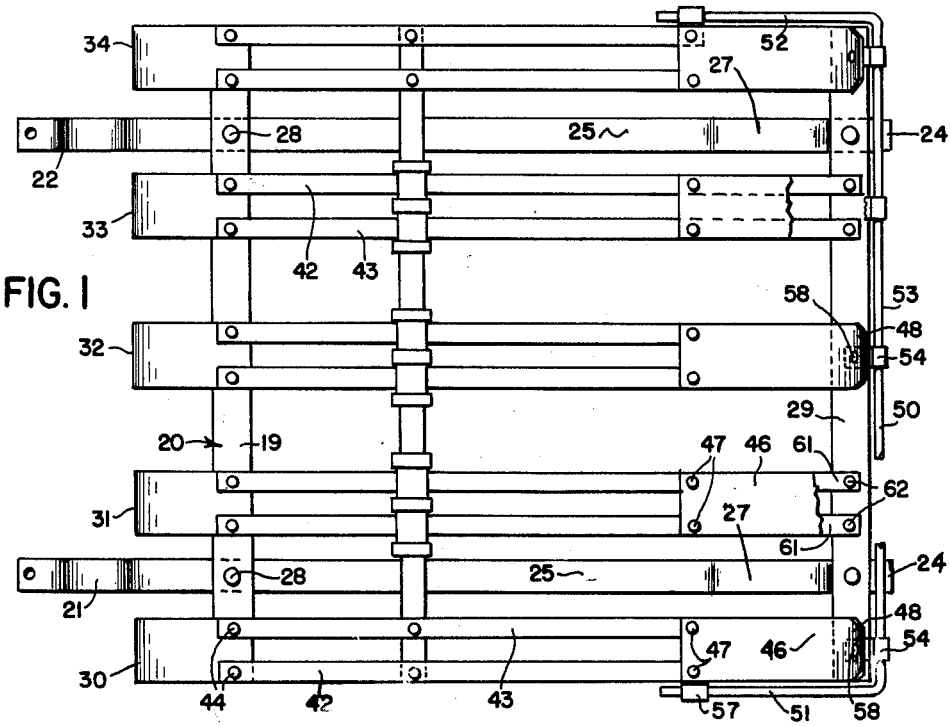
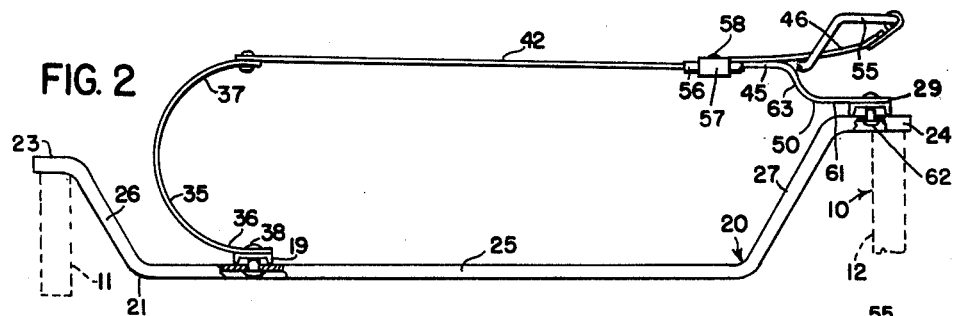
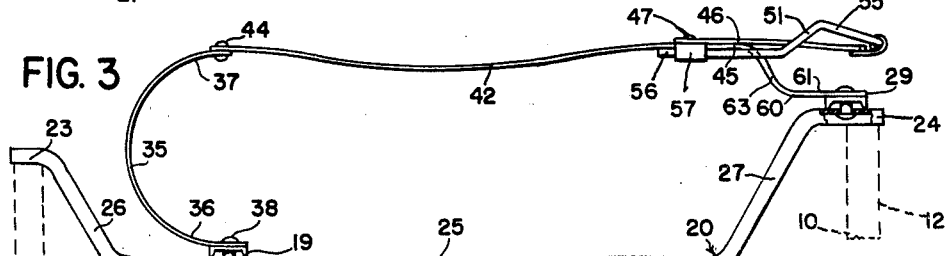
INVENTOR.
SAMUEL L. SANTILLO
BY
*Caswell Lagaard & Wicks*
ATTORNEYS

United States Patent Office 3,156,460
Patented Nov. 10, 1964

3,156,460
SEAT SPRING STRUCTURE
Samuel L. Santillo, Dubuque, Iowa, assignor to Flexsteel Industries Incorporated, Dubuque, Iowa, a corporation of Minnesota
Filed July 25, 1962, Ser. No. 212,227
5 Claims. (Cl. 267—102)

The herein disclosed invention relates to seat springs and particularly to seat spring structures utilizing leaf springs and has for an object to provide a seat spring structure utilizing almost entirely leaf spring.

Another object of the invention resides in providing a spring structure utilizing C-shaped leaf springs in the manner shown in the patent to Crahan No. 2,788,844 issued April 16, 1957, for spring structures and in which the forward C-shaped leaf springs are eliminated.

A still further object of the invention resides in providing a leaf spring structure having a soft forward edge.

Other objects of the invention resides in the novel combination and arrangement of parts and in the details of construction hereinafter illustrated and/or described.

In the drawings:

FIGURE 1 is a plan view of a seat spring structure illustrating an embodiment of my invention.

FIGURE 2 is a side elevational view of the same.

FIGURE 3 is a view similar to FIGURE 2 illustrating the position of the parts when the spring is in use.

For the purpose of illustrating the invention, the front and rear rails 11 and 12 of a seat frame 10 have been shown in dotted lines in FIGURE 2.

The spring structure shown in the drawings consists of a supporting frame 20 comprising two longitudinally extending frame members 21 and 22. These frame members are in the form of channels and are spaced from one another and form the outermost portion of the frame structure as shown in FIGURE 1. The said frame members have frame offsets 23 and 24 at the ends of the same and which are adapted to rest on the rails 11 and 12 and to be secured thereto by means of screws not shown. The frame offsets 23 and 24 are connected to the body portions 25 of the frame members 21 and 22 by frame connecting portions 26 and 27. The connecting portions 26 and 27 are of suitable length to bring the seat at the proper elevation with reference to the seat frame 10. Secured to the frame members 21 and 22 by means of rivets 28 are two transverse frame members 19 and 29. The frame member 19 is secured to the bodies 25 of the frame members 21 and 22 while the frame member 29 is secured to the frame offsets 24 of said frame members as best shown in FIGURES 2 and 3.

Attached to the frame members 19 and 29 are a number of spring units 30, 31, 32, 33, and 34. These units are identical in construction and only the spring unit 30 which is illustrated in FIGURES 2 and 3 will be described in detail. This spring unit consists of a leaf spring 35 which is C-shaped in form and which has a lower leg 36 and an upper leg 37. The legs 36 of the various spring units are riveted to the transverse frame member 19 by means of rivets 38. Attached to the upper leg 37 of the spring member 30 are two longitudinal leaf springs 42 and 43. These springs are spaced from one another and secured to the leg 37 of spring 35 by means of rivets 44. The other units 31, 32, 33, and 34 are attached to the frame member 19 in the same manner and are spaced from one another, the spring units 30 and 34 being disposed at the ends of the transverse frame members 19. The forward ends 45 of the spring members 42 and 43 have attached to them supplemental leaf springs 46 which are secured thereto by means of rivets 47. An edging member 50 is employed which is constructed of wire or a rod bent U-shaped in form with legs 51 and 52 and with a connecting portion 53 therebetween. The connecting portion lies along the extreme forward ends 48 of the springs 46 and are attached thereto by means of clips 54 riveted to said ends of the springs 46 by means of rivets 58. The legs 51 and 52 are constructed with offsets 55 adjacent the connecting portion 53 and with terminal portions 56 lying along the outer sides of the springs 42. The terminal portion is secured to the spring 46 by means of a clip 57 which is held under rivets 47 securing the spring 46 to spring 42. The springs 46 are normally bent upwardly as shown in FIGURE 2 and when the spring structure is loaded, flex downwardly as shown in FIGURE 3.

The springs 42 and 43 are formed with extensions 60 projecting outwardly beyond the forward portions 45 of said springs. The extensions 60 have spring offsets 61 which are secured to the transverse frame member 29 means of rivets 62. The offsets 61 are connected to the forward ends 45 of the springs 42 and 43 by means of spring connecting portions 63.

The operation of the invention is obvious. When a load is placed upon the springs 42 and 43 of the various spring units, the springs curve downwardly as shown in FIGURE 3 and the springs 46 are also flexed downwardly as illustrated. The drawing of the leg 37 of C-spring 35 forwardly by curving the springs 42 and 43 downwardly is offset by the straightening out of the connecting portion 63 of the extension 60. Thus, the C-springs 30, 31, 32, 33, and 34 do not move appreciably in a back and forth direction and merely move up and down. The springs 46 can be constructed of a different material than the springs 42 and 43 so that any desired flexure can be provided. In this manner, a spring with a soft front edge can be procured.

The advantages of the invention are manifest. The construction is extremely simple and serves the same purpose as the structure shown in the denoted patent and without the use of the C-springs at the front of the spring structure. This is accomplished by using different material for the springs 46 instead of the same material. Thus, different degrees of flexing at the edging member can be procured. A spring constructed in accordance with the instant invention can be constructed at less expense than the spring of the denoted patent.

I claim:

1. In a seat spring structure comprising a supporting frame having spaced longitudinal frame members each formed with a body portion and front and rear frame offsets disposed above said body portion and front and rear transverse frame members secured thereto, transversely spaced spring units carried by said frame and including upright C-shaped leaf springs secured at their lower ends to said rear transverse frame member and substantially horizontal longitudinal leaf springs secured to the upper ends of said C-shaped leaf springs and extending forwardly thereof, the combination of:

(a) said forward transverse frame member resting on the forward frame offsets of said longitudinal frame members and being secured thereto;

(b) spring offsets formed on the forward portions of said longitudinal leaf springs and disposed below the same and extending in a forward direction, said offsets resting on and being secured to said forward frame member, (c) spring connecting portions connecting said spring offsets to said springs at the forward portions thereof, (d) supplemental leaf springs attached to said longitudinal leaf springs rearwardly of the offsets therein and extending forwardly thereof, and (e) an edging member secured to the forward ends of said supplemental leaf springs.

2. In a seat spring structure comprising a supporting frame having spaced longitudinal frame members each formed with a body portion and front and rear frame offsets disposed above from said body portions and front and rear transverse frame members secure thereto, transversely spaced spring units carried by said frame and including upright C-shaped leaf springs secured at their lower ends to said rear transverse frame member and substantially horizontal longitudinal leaf springs secured to the upper ends of said C-shaped leaf springs and extending forwardly thereof, the combination of:

(a) a forward edging member, (b) means for attaching said edging member to said longitudinal leaf springs at the forward portions thereof, (c) extensions formed on and integral with the forward ends of said longitudinal leaf springs and each comprising:

(d) a downwardly and forwardly extending spring connecting portion issuing from the forward ends of said longitudinal springs and, (e) a forwardly extending substantially horizontally disposed spring offset issuing from the lower forward end of said spring connecting portion and resting on and secured to said front transverse frame member.

3. In a seat spring structure comprising a supporting frame having spaced longitudinal frame members each formed with a body portion and front and rear frame offsets disposed above from said body portions and front and rear transverse frame members secured thereto, transversely spaced spring units carried by said frame and including upright C-shaped leaf springs secured at their lower ends to said rear transverse frame member and substantially horizontal longitudinal leaf springs secured to the upper ends of said C-shaped leaf springs and extending forwardly thereof, the combination of:

(a) said forward transverse frame member resting on the forward frame offsets of said longitudinal frame members and being secured thereto, (b) spring offsets formed on the forward portions of said longitudinal leaf spring and disposed below the same and extending in a forward direction, said offsets resting on and being secured to said forward transverse frame member, (c) said spring offsets and spring connecting portions being integral with said longitudinal leaf springs, (d) supplemental leaf springs attached to said longitudinal leaf springs rearwardly of the spring offsets therein and extending forwardly thereof, and (e) an edging member secured to the forward ends of said supplemental leaf springs.

4. In a seat spring structure comprising a supporting frame having spaced longitudinal frame members and front and rear transverse frame members secured thereto, transversely spaced spring units carried by said frame and including upright C-shaped leaf springs secured at their lower ends to said rear transverse frame member and substantially horizontal longitudinal leaf springs secured to the upper ends of said C-shaped leaf springs and extending forwardly thereof, the combination of:

(a) offsets formed on the forward portions of said longitudinal leaf spring and disposed below the same and extending in a forward direction, said offsets resting on and being secured to said forward transverse frame member, (b) supplemental leaf springs attached to said longitudinal leaf springs rearwardly of the offsets therein and extending forwardly thereof, and (c) an edging member secured to the forward ends of said supplemental leaf springs.

5. In a seat spring structure comprising a supporting frame having spaced longitudinal frame members and front and rear transverse frame members secured thereto, transversely spaced spring units carried by said frame and including upright C-shaped leaf springs secured at their lower ends to said rear transverse frame member and substantially horizontal longitudinal leaf springs secured to the upper ends of said C-shaped leaf springs and extending forwardly thereof, the combination of:

(a) a forward edging member, (b) means for attaching said edging member to said longitudinal leaf springs at the forward portions thereof, (c) extensions formed on and integral with the forward ends of said longitudinal leaf springs and each comprising:

(d) a downwardly and forwardly extending spring connecting portion issuing from the forward ends of said longitudinal springs and, (e) a forwardly extending substantially horizontally disposed spring offset issuing from the lower forward end of said spring connecting portion and resting on and secured to said front transverse frame member.

References Cited in the file of this patent
UNITED STATES PATENTS

| 2,568,071 | Johnson | Sept. 18, 1951 |
| 2,788,844 | Crahan | Apr. 16, 1957 |